(12) United States Patent
Montalban

(10) Patent No.: US 10,928,651 B2
(45) Date of Patent: Feb. 23, 2021

(54) ELASTIC HINGE FOR SPECTACLE FRAME TEMPLES, WITH LOCKING CLIP ENGAGED ON THE BODY OF THE CARRIAGE

(71) Applicant: VISOTTICA INDUSTRIE S.p.A., Susegana (IT)

(72) Inventor: Rinaldo Montalban, Susegana (IT)

(73) Assignee: VISOTTICA INDUSTRIE S.P.A., Susegana (IT)

( * ) Notice: Subject to any disclaimer, the term of this patent is extended or adjusted under 35 U.S.C. 154(b) by 110 days.

(21) Appl. No.: 16/283,136

(22) Filed: Feb. 22, 2019

(65) Prior Publication Data
US 2019/0271857 A1 Sep. 5, 2019

(30) Foreign Application Priority Data

Mar. 2, 2018 (IT) .................. 102018000003212

(51) Int. Cl.
*G02C 5/22* (2006.01)

(52) U.S. Cl.
CPC ......... *G02C 5/2245* (2013.01); *G02C 5/2236* (2013.01); *G02C 2200/30* (2013.01)

(58) Field of Classification Search
CPC .... G02C 2200/06; G02C 5/22; G02C 5/2245; G02C 5/2254; G02C 5/2272; G02C 5/2236; G02C 5/2227; G02C 5/2218; G02C 5/06; G02C 5/2281
USPC ............................................ 351/153; 16/228
See application file for complete search history.

(56) References Cited

U.S. PATENT DOCUMENTS

| 7,350,271 B2 | 4/2008 | Genelot | |
| 7,572,005 B2 | 8/2009 | Hotellier | |
| 2007/0089268 A1* | 4/2007 | Genelot | G02C 5/2236 16/228 |
| 2010/0091237 A1* | 4/2010 | Medana | G02C 5/2236 351/153 |

(Continued)

FOREIGN PATENT DOCUMENTS

| CN | 104777627 | 7/2015 |
| CN | 107678177 | 2/2018 |

(Continued)

OTHER PUBLICATIONS

Italian Search Report for Application No. IT 201800003212 dated Sep. 21, 2018.

*Primary Examiner* — Hung X Dang
(74) *Attorney, Agent, or Firm* — Nixon & Vanderhye (57) ABSTRACT

An elastic hinge for spectacle frames and manufacturing method thereof are disclosed, wherein the hinge includes a fork female component and an eyelet male component mutually hinged, the male component including at least one carriage slidingly fit in a cavity housing of a box-shaped body in contrast with an elastic element constrained with respect to the box-shaped body by way of a locking clip being provided with an annular collar which encircles a stem portion of the carriage, arranged between one end of the elastic element and a rear abutment end surface of a guide portion of the carriage. At least a groove is formed in the guide portion, adjacent to the perimeter profile of the stem portion, having a depth in the direction of the longitudinal axis of the carriage, defining a seat wherein at least a substantial part of the annular collar is engaged.

9 Claims, 5 Drawing Sheets

(56) References Cited

U.S. PATENT DOCUMENTS

2018/0011345 A1 1/2018 Montalban

FOREIGN PATENT DOCUMENTS

| EP | 0395939 | 11/1990 |
| EP | 1 743 207 B1 | 1/2007 |
| EP | 2553519 | 2/2013 |
| WO | 2008/096251 A1 | 8/2008 |

* cited by examiner

ELASTIC HINGE FOR SPECTACLE FRAME TEMPLES, WITH LOCKING CLIP ENGAGED ON THE BODY OF THE CARRIAGE

FIELD OF THE INVENTION

The present invention relates to an elastic or flex hinge for mounting temples on spectacle frames.

BACKGROUND ART

As is known, in the eyewear field, various types of hinges are used, which are arranged between the two lateral ends of the frame front and the respective pivoting temples. These hinges in general are formed by a female component, typically fixed to end-pieces of the front frame of the spectacle and comprising at least one pivot fork, and a male component, typically fixed to the temples and comprising at least one eyelet for the engagement with the fork of the female component, the two components being then constrained to each other by means of a pin or a hinge screw, which allows their mutual rotation.

Among the various types of hinges, the so-called flexible hinges allow a snap movement, opening and closing movement, and over-opening elastic rotation of the temples; in this case, the male component traditionally comprises a slider or sliding guided carriage, movable against an elastic element, inside a housing integral with the temple of the spectacle. The elastic sliding of the carriage takes place by action of a cam portion which, during the rotation of the temple, causes the end of the temple to move away and close to the end-piece of the spectacles, so as to determine the desired snap movement.

The housing is normally constituted in the form of a box-shaped body, mounted on each temple and within which a sliding hole of the carriage is made.

The carriage is typically an elongated metal component, which is provided, at its proximal end, with a protruding head formed with an eyelet for coupling, by means of a joint pin, with the fork of the female component. The projecting head with coupling eyelet can sometimes be double or even triple, i.e. having two or three parallel eyelets.

The alternate sliding movement of the carriage in the housing box-shaped body is opposed by an elastic element, normally in the form of a helical spring. This helical spring, on one end, is integral with a portion of the carriage (typically the distal end of the carriage, that is the one on the bottom side of the housing) while, on the other end, it is constrained to the box-shaped body. In this way, the sliding movement of the carriage—which will be discussed later—results in a compression of the spring, which in turn produces the desired elastic reaction.

In resting conditions, the eyelet head of the slider protrudes from the open end of the housing box-shaped body, to engage the female element through the hinge pin. At the same time a terminal surface of the open end, or proximal end, of the housing box-shaped body, abuts against an opposed surface of the female element.

As mentioned above, the terminal surface of the female fork is shaped with a cam profile that, by cooperating in contrast with the surface of the male element, acts, upon rotation of the two hinge parts, in the direction of moving the rotation pin away/near the box-shaped body, in contrast to the reaction of the elastic element. The arrangement is in fact such that, when the spectacle temple is in the resting position, the open end of the box-shaped body rests against the corresponding surface of the female element, with an abutting force which is determined by the pre-tensioning of the elastic element and which is sufficient to hold the temple in the correct position, both in closed and open configuration.

On the other hand, when the temple is moved a few degrees beyond the standard opened position—which is representing the over-opening condition—the terminal surface of the box-shaped body, by levering the opposed cam surface of the female hinge component, causes the box-shaped body to move away from said rotation pin, further extracting the carriage and thus further biasing the elastic element. Therefore, when the temple is released, it is returned to its initial opened position.

This elastic hinge structure is well known and is widely used in many different embodiments.

Figure 1:
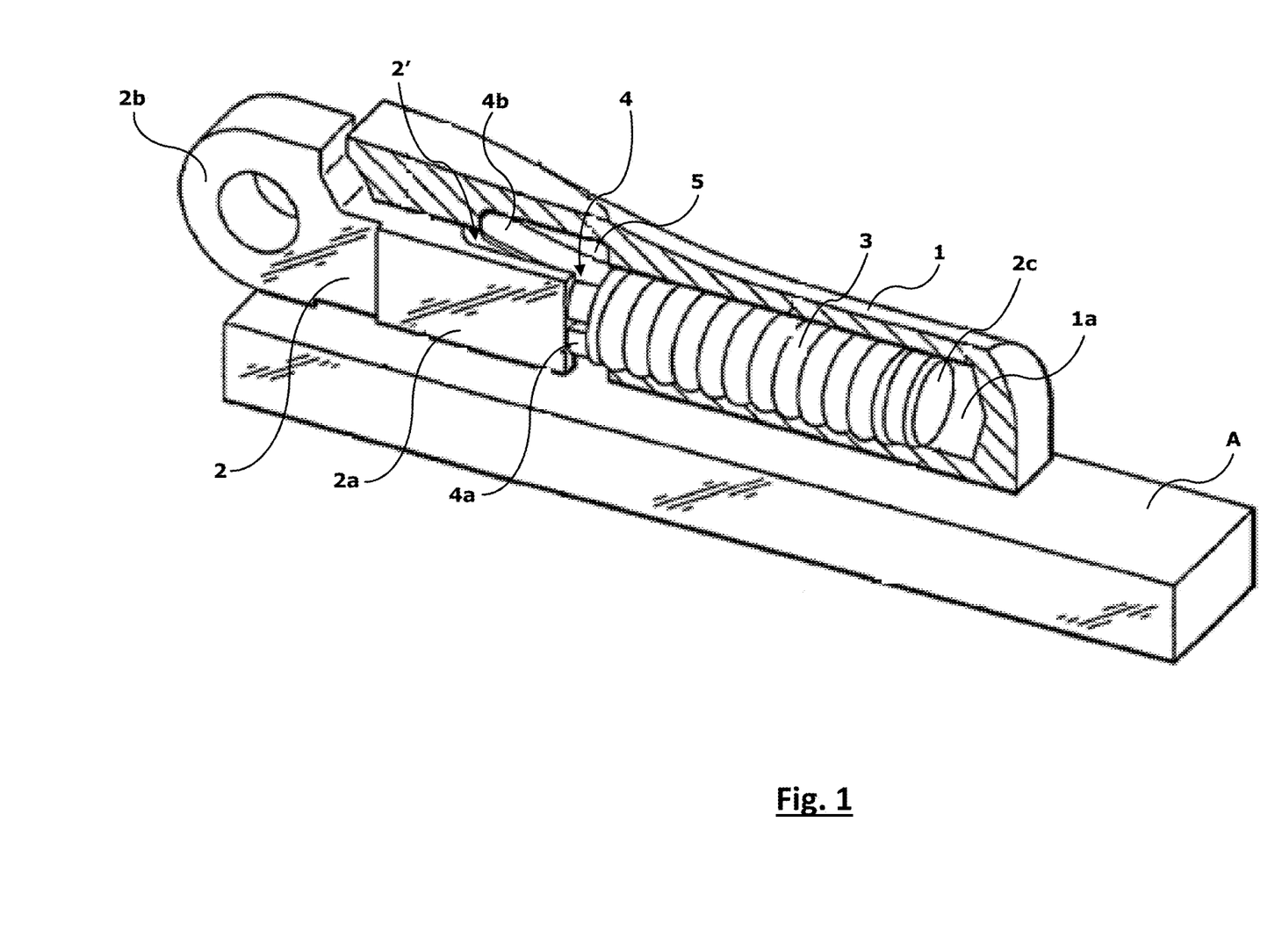
FIG. 1, as already said, is a perspective view of a carriage of the prior art for a flexible hinge.
Figure 2:
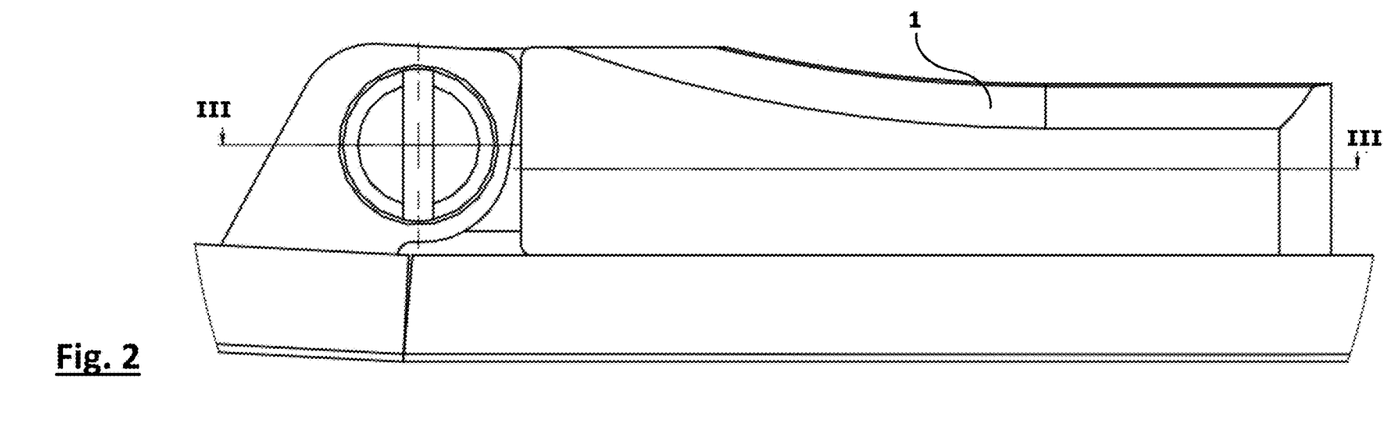
FIG. 2 is an elevational side view, partially interrupted, of a hinge according to the invention.
Figure 3:
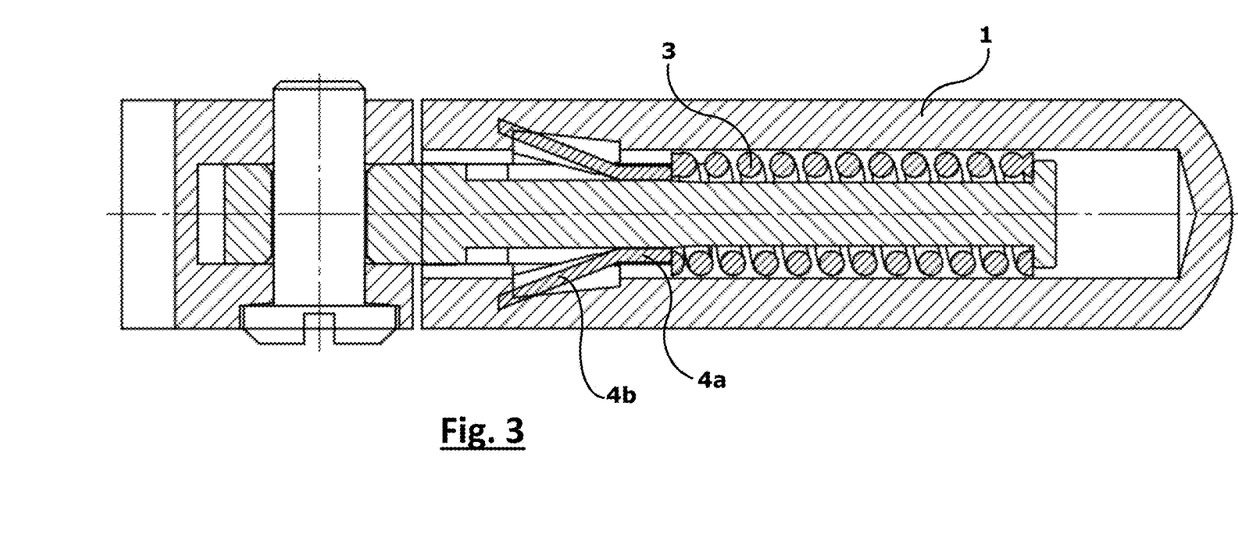
FIG. 3 is a longitudinal sectional view according to the trace III-III of FIG. 2.
Figure 4:
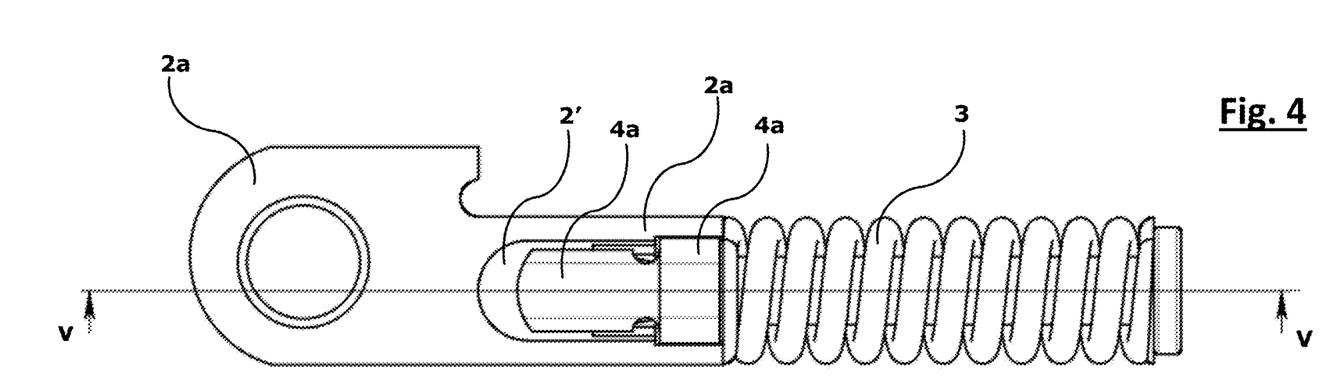
FIG. 4 is an elevation side view of the sole assembly of the carriage inside the hinge of FIG. 2.
Figure 5A:
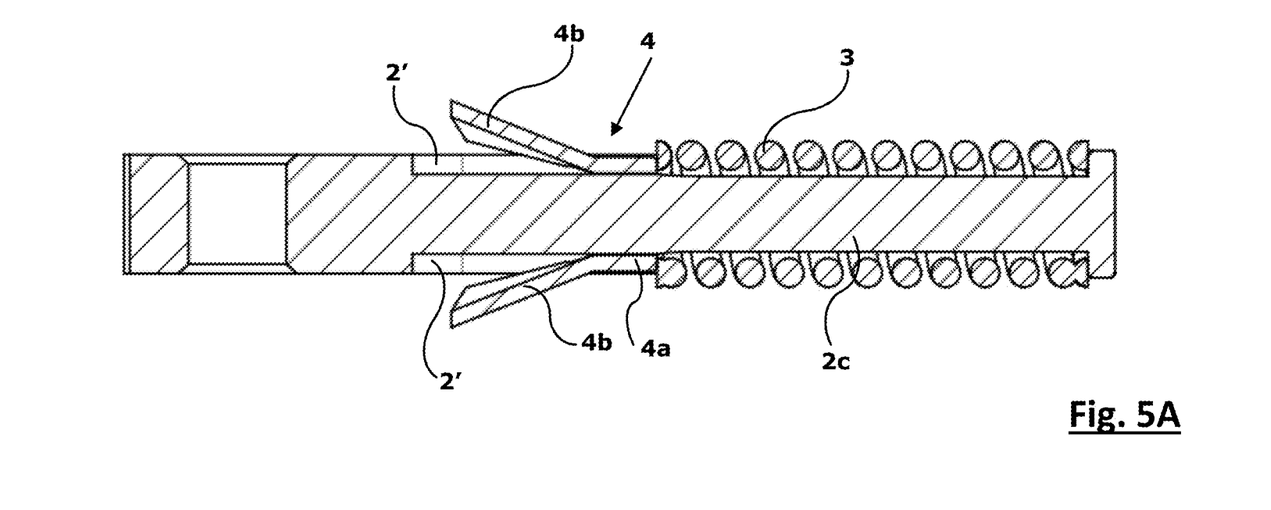
FIG. 5A is a longitudinal sectional view according to the trace V-V of FIG. 4.
Figure 5B:
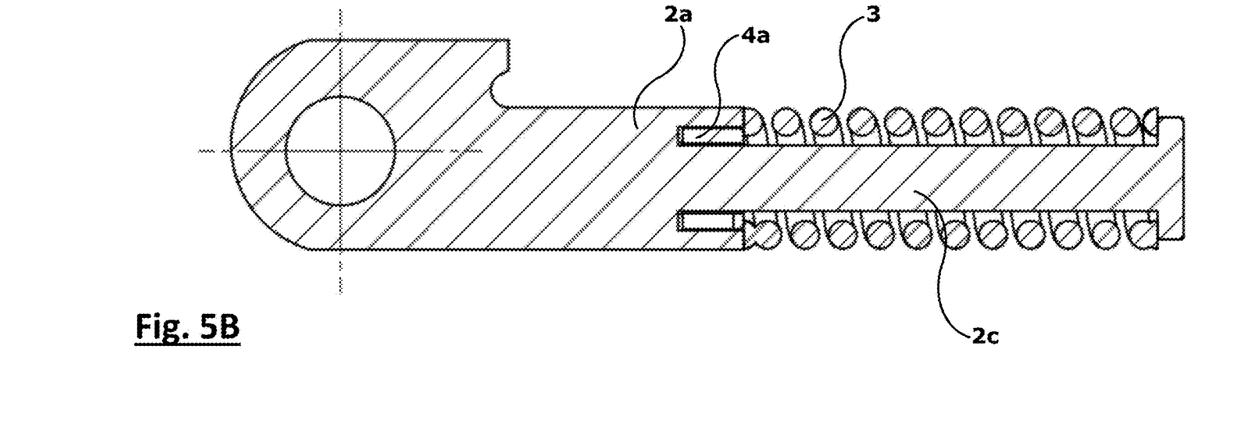
FIG. 5B is a longitudinal sectional view according to a centreline plane of the carriage of FIG. 4.
Figure 6:
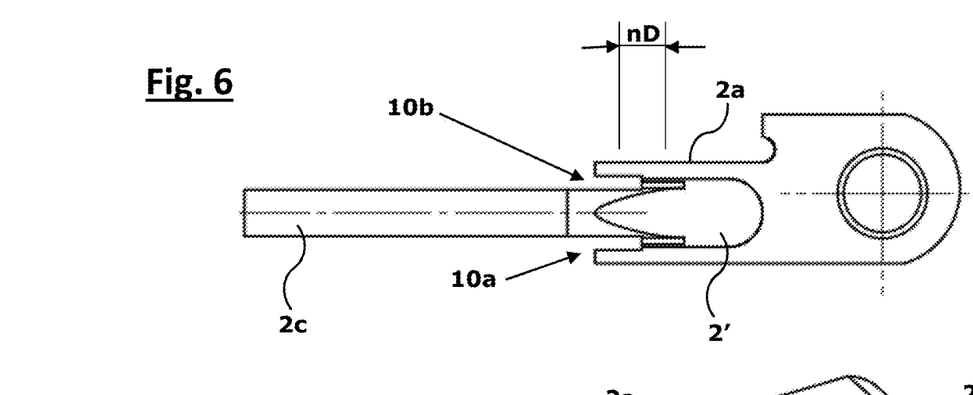
FIGS. 6 and 7 are, respectively, elevational side view and perspective view of the sole carriage according to the invention.
Figure 7:
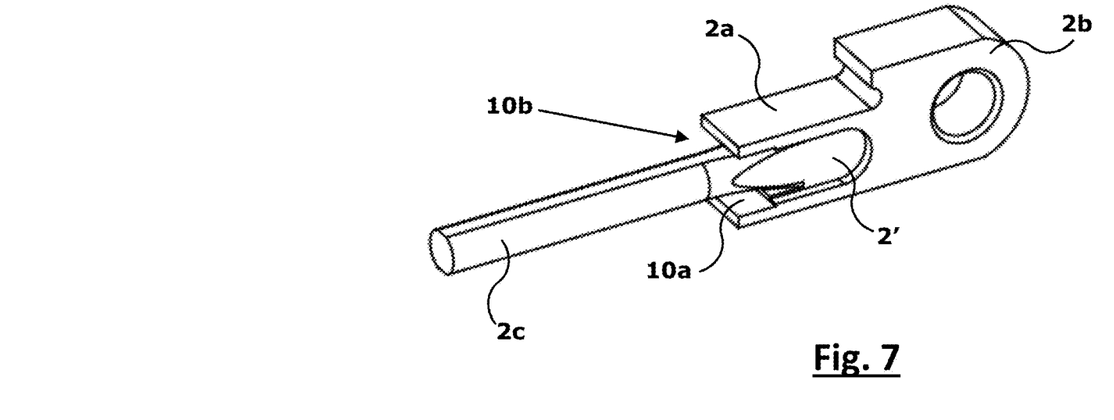
Figure 8:
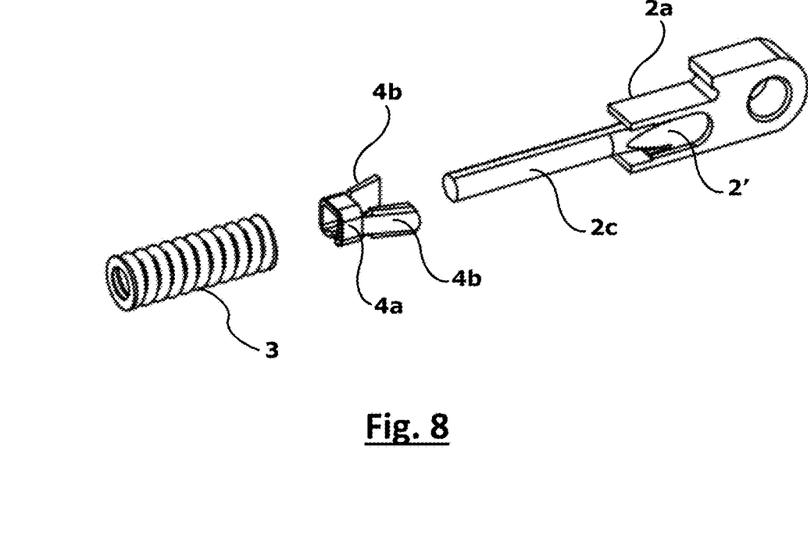
FIGS. 8 and 9 are perspective views, respectively exploded and in assembled form, of the carriage assembly of FIG. 4.
Figure 9:
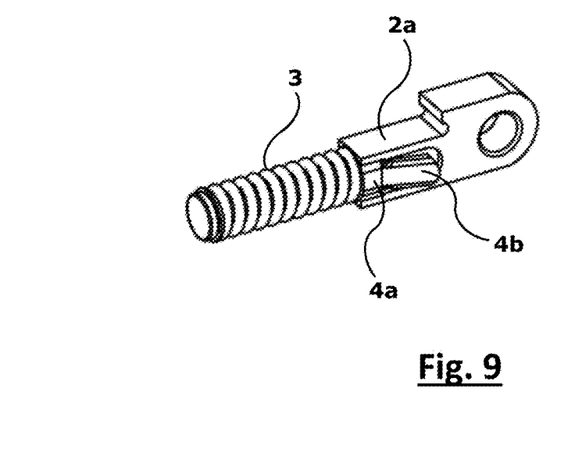

EP 1,743,207 discloses an elastic hinge which has had considerable success in the market, which is the closest prior art to the invention. As shown in FIG. 1—which is a perspective view of a hinge carriage in its housing partially sectioned—a carriage has a central guide body, slidable in the housing of the box-shaped body, which extends into an eyelet head and, on the opposite side, in a spring supporting stem. Between a proximal end of the spring and the central guide body is arranged a locking clip provided with two elastic tabs designed to snap engage with specially designed recesses in the inner cavity of the housing. The clip is formed by a central annular portion, which is fitted onto the stem of the carriage, and by two elastic tabs projecting radially with a certain slope from the annular portion. Advantageously, the solution proposed in EP 1,743,207 provides two recesses also in the central guide body of the carriage, suitable for housing the elastic tabs when they are folded during the introduction of the carriage into the housing: this solution has the advantage of still offering a significant length of the guiding surface on central guide body and therefore to efficiently guide the carriage.

It should however be noted that the overall length of the carriage is determined by the sum of the minimum length requirements of the central guide body, the length of the spring and the length of the annular body of the clip.

Therefore, the minimum length of the carriage cannot be reduced beyond a certain extent if it is not desired to compromise an efficient guide or an appropriate reaction force of the spring.

Similar configurations are disclosed in WO2008/096251 and US2018/0011345, wherein the overall length footprint is given by the sum of the lengths of the guide body, of the spring and of the annular body of the clip.

SUMMARY OF THE INVENTION

Since there is a demand for miniaturizing this kind of elastic hinge as much as possible, it would be desirable to be able to further reduce the overall length of the carriage.

It is therefore an object of the present invention to provide a flexible hinge for spectacles wherein it is possible to reduce the length of the carriage, without compromising the guiding qualities of the central body and an appropriate reaction and duration of the elastic spring.

This object is achieved by the features set out in their essential terms in claim 1. The dependent claims describe preferred features of the invention.

According to a first aspect of the invention, it is provided an elastic hinge for spectacle frames, comprising a fork female component and an eyelet male component mutually hinged, said male component comprising at least one carriage slidingly fit in a cavity housing of a box-shaped body in contrast with an elastic element constrained with respect to said box-shaped body by means of a locking clip, said clip being provided with an annular collar which encircles a stem portion of said carriage, arranged between one end of said elastic element and a rear abutment end surface of a guide portion of said carriage wherein at least a groove is formed in said guide portion, adjacent to the perimeter profile of said stem portion, having a depth in the direction of the longitudinal axis of the carriage, defining a seat wherein at least a substantial part of said annular collar is engaged.

According to another aspect, said seat is comprised of at least two straight and parallel opposite grooves.

According to a preferred embodiment, recesses are also provided on the sides of said guide portion, having a bottom surface at 90° with respect to said straight grooves, adapted to house elastic tabs integral with said annular collar.

The bottom surface of said recesses is flush with the perimeter profile of said stem portion.

Said grooves have a width greater than the section thickness of said annular collar, said width being preferably 0.6 mm to 0.9 mm.

According to another aspect, it is supplied a method of manufacturing a hinge as above, wherein said grooves are obtained by means of a milling tool provided with at least cutting edge having a width greater than the section thickness of the annular collar.

BRIEF DESCRIPTION OF THE DRAWINGS

Further features and advantages of the invention will anyhow be more evident from the following detailed description of a preferred embodiment, given by mere way of non-limiting example and illustrated in the accompanying drawings, wherein.

DETAILED DESCRIPTION OF A PREFERRED EMBODIMENT

For a better understanding of the invention, first of all a detailed description of the prior art illustrated in FIG. 1, which corresponds to the solution disclosed in EP 1,743,207, is provided.

In FIG. 1, a flexible hinge component for spectacles is depicted, in particular the male component.

In a box-shaped body 1, typically obtained or fixed to a temple A of a pair of spectacles, a longitudinal housing 1a is provided, comprising a cavity within which a sliding carriage assembly is housed. The latter consists of a carriage 2, a return spring 3 and a locking clip 4 for the spring 3.

The carriage 2 comprises a central guide portion 2a, cooperating with a central guide area in a cavity 1a of the housing 1, a proximal end part, forming an eyelet 2b, projecting outwardly of the housing 1, and a distal stem shaped portion 2c, on which the spring 3 is mounted.

The spring 3 is kept compressed between a terminal end of the stem 2c and the clip 4, made integral with the box-shaped body 1 in the manner better described in the following.

The clip 4 provides an annular collar body 4a, mounted on the stem portion of the carriage, and at least one elastic tab 4b, preferably two opposing elastic tabs, which protrudes radially from the collar 4a, obliquely at a given angle, and forward, towards the inlet opening of the housing 1. Typically, the clip is manufactured from sheared and folded metal sheet, therefore the annular collar 4a has a uniform thickness of about 0.2 mm. In the assembled position shown in FIG. 1, with the carriage inserted inside the cavity 1a, the free ends of the elastic tabs 4b extend towards the inlet of the housing 1 and engage within respective notches 5 provided inside the housing 1.

On the main body 2a of the carriage are also provided recesses 2', adapted for accommodating at least partially the tabs 4b in the assembly step.

This arrangement allows to preliminary assemble the assembly consisting of the carriage 2, the spring 3 and the clip 4 and then insert it into the housing 1, introducing it by sliding from its inlet opening. During the insertion, the tabs 4b are forced and made to collapse towards the central axis of the carriage, entering the recesses 2'. When, by sliding inside the housing 1, the tabs 4b are in correspondence of notches 5, they can return back to the extended position and snap into these notches 5. Once the tabs 4b are snap engaged into notches 5, it is no longer possible to collapse them again and then the clip 4 remains locked in position with respect to the housing 1.

In FIGS. 3-9 a carriage assembly similar to the one described above is shown, except that the flexible tabs of the clip are arranged rotated by 90° around the longitudinal axis, with respect to those of FIG. 1. The operation and configuration, for the common aspects, are completely equivalent. Like references are assigned to corresponding parts.

According to the preferred embodiment of the invention illustrated in the figures, on the main guide portion 2a of the carriage 2—in addition to a recess 2' or to a pair of opposite recesses for accommodating the tabs 4b of the clip 4—at least two opposite grooves 10a and 10b are provided in the rear end surface, flush with the outer profile of the carriage stem 2c.

In the context of the present specification, the term 'flush with' means that a surface is tangential or coplanar to the other surface at least in a connection point.

The grooves 10a and 10b extend in depth from a rear end surface of the main guide portion 2a—i.e. the end from which the stem 2c projects—in longitudinal direction (i.e. parallel to the longitudinal axis of the carriage), for a distance substantially equal to the longitudinal length D of the annular collar 4a of the clip 4.

Preferably the two grooves 10a and 10b are parallel and rectilinear and are obtained by means of a milling tool having a cutting edge of reduced thickness. Each groove has a width in the range from 0.6 mm to 0.9 mm, however greater than the thickness of the annular collar 4a, in particular the thickness of the sheet material by which the annular collar is made.

According to the illustrated embodiment, two recesses 2' for the housing of the flexible tabs 4b of the clip 4 are also provided on two sides of the guiding portion 2a at 90° with respect to the direction of the two grooves 10a and 10b. The recesses 2' extend from the rear end of the main guide portion 2a to a length and a width proportional to the length and width of the tabs 4b, thus leaving perimeter areas on the side of the guide portion 2a which can act as guide surfaces in cooperation with the cavity in the housing 1. The recesses 2' are made, for example, with a chip-removal tool, such as a slot mill, and have a depth such that the bottom surface is flush with the profile of the stem 2c (as well illustrated in FIG. 7).

Optionally, the same mill tool used for producing said recesses 2' has a profile suitable to produce at the same time also half portion of the two grooves 10a and 10b. For example, a milling tool having a U profile, is suitable to simultaneously produce both a recess 2' and half portion of the two opposite grooves 10a, 10b on the same side of the guiding body.

With this construction, it is obtained that the outer guide surface of the main guiding portion 2a remains substantially unaffected with respect to the prior art, while the material removed around the stem 2c in the area of connection with the rear end of the main body 2a defines a hiding seat for the collar.

The removal of material defined in the guide body 2a by the grooves 10a, 10b, possibly in combination with the one defined by the recesses 2', defines a hiding seat for fitting the annular collar 4a. In short, by keeping the outer surface of the main guide portion 2a unchanged—thus ensuring the guiding performance within the housing 1—a coupling seat is obtained which substantially houses the annular collar 4a within the longitudinal volume occupied by the main guide body 2a within the housing.

In other words, it is thus obtained that the annular collar 4a no longer interposes between the spring 3 and the rear end of the main guide portion 2a—as in the prior art—but remains almost entirely housed within the grooves 10a and 10b.

Thanks to this arrangement, and as it is evident in FIGS. 4, 5B, 8 and 9, the body of the annular collar 4a may be entirely encased in the massive part of the main guide body 2a, making available the corresponding length on the stem 2c of the carriage. This free length can be exploited to extend the spring 3 or the guide surface of the main portion 2a, while keeping the same length of the carriage; alternatively, it is possible to reduce the overall length of the carriage (=greater miniaturization) while keeping the same efficiency of the other elements.

The manufacturing method of the carriage according to the invention can be identical to that established for the carriage of the prior art, e.g. by cutting from profiled bar and subsequent finishing by chip removal, or by shearing/punching from metal strips and subsequent cold deformation process. Once the carriage has been obtained in the traditional way, with a milling tool it is possible to obtain both the recesses 2' and the grooves 10a, 10b which determine the hiding seat of the annular collar 4a.

It is understood, however, that the invention is not to be considered as limited by the particular arrangement illustrated above, which represents only an exemplary embodiment of the same, but different variants are possible, all within the reach of a person skilled in the art, without departing from the scope of the invention itself, as defined by the following claims.

For example, although the guide body 2a has always been illustrated with a rectangular sectional profile, it cannot be excluded that it may have another geometrical shape.

Also, the relative shapes and dimensions of the guide body, of the rear stem and of the front eyelet can vary widely with respect to what is shown in the drawings.

Moreover, reference has been made to a preferred method for creating the hiding seat of the annular collar, but it is not excluded that the same seat can be obtained with a single milling operation for a groove or by deformation of the material rather than by chip removal.

Finally, in case side recesses 2' are not provided for the elastic tabs 4b, it is understood that seat of the annular collar can be made by providing a groove having longitudinal depth on the rear surface of the guiding body which is extending over the entire circumferential perimeter of the stem section.

The invention claimed is:

1. An elastic hinge for spectacle frames, comprising:
a fork female component; and
an eyelet male component mutually hinged to the female component,
said male component comprising at least one carriage (2) slidingly fit in a cavity housing of a box-shaped body (1) in contrast with an elastic element (3) constrained with respect to said box-shaped body (1) by a locking clip (4),
said clip (4) being provided with an annular collar (4a) which encircles a stem portion (2c) of said carriage (2), arranged between one end of said elastic element (3) and a rear abutment end surface of a guide portion (2a) of said carriage (2),
wherein at least a groove (10a, 10b) is formed in a rear endmost surface in said guide portion (2a), adjacent to a perimeter profile of said stem portion (2c), having a depth in a direction of a longitudinal axis of the carriage, the at least a groove (10a, 10b) defining a seat wherein at least a substantial part of said annular collar (4a) is engaged.

2. The elastic hinge as in claim 1, wherein the at least a groove (10a, 10b) defining said seat is comprised of at least two straight and parallel opposite grooves (10a, 10b).

3. The elastic hinge as in claim 2,
wherein the two straight and parallel opposite grooves (10a, 10b) are flush with an outer profile of the carriage stem (2c).

4. The elastic hinge as in claim 3,
wherein the two straight and parallel opposite grooves (10a, 10b) are rectilinear.

5. The elastic hinge as in claim 1, wherein recesses (2') are also provided on a side of said guide portion (2a), the recesses (2') having a bottom surface at 90° with respect to said straight grooves (10a, 10b), adapted to receive elastic tabs (4b) integral with said annular collar (4a).

6. The elastic hinge as in claim 5, wherein said bottom surface of said recesses (2') is flush with the perimeter profile of said stem portion (2c).

7. The elastic hinge as in claim 1, wherein said at least one groove (10a, 10b) has a width greater than a section thickness of said annular collar (4a).

8. The elastic hinge as in claim 7, wherein said width is 0.6 mm to 0.9 mm.

9. A method of manufacturing the elastic hinge as in claim 1, comprising the step of obtaining said at least one groove (10a, 10b) by using a milling tool provided with at least a cutting edge having a width greater than a section thickness of said annular collar (4a).

\* \* \* \* \*